US011095083B2

(12) United States Patent
Rubin et al.

(10) Patent No.: US 11,095,083 B2
(45) Date of Patent: Aug. 17, 2021

(54) CONNECTOR ELECTRICAL CONTACT RE-SETTING TOOL

(71) Applicant: Raytheon Company, Waltham, MA (US)

(72) Inventors: Alan K. Rubin, Seminole, FL (US); Matthew Krasne, Seminole, FL (US); James Festa, Pinellas Park, FL (US)

(73) Assignee: Raytheon Company, Waltham, MA (US)

( * ) Notice: Subject to any disclaimer, the term of this patent is extended or adjusted under 35 U.S.C. 154(b) by 415 days.

(21) Appl. No.: 16/224,706

(22) Filed: Dec. 18, 2018

(65) Prior Publication Data

US 2020/0194953 A1 Jun. 18, 2020

(51) Int. Cl.

| | |
|---|---|
| ***B23P 11/00*** | (2006.01) |
| ***H01R 43/22*** | (2006.01) |
| *H01R 107/00* | (2006.01) |
| *H01R 24/28* | (2011.01) |
| *H01R 24/76* | (2011.01) |

(52) U.S. Cl.

CPC ............ *H01R 43/22* (2013.01); *H01R 24/28* (2013.01); *H01R 24/76* (2013.01); *H01R 2107/00* (2013.01)

(58) Field of Classification Search

CPC ......... H01R 24/28; H01R 43/22; B23P 11/00; B23P 11/027; B25B 3/00; B25B 7/00

See application file for complete search history.

(56) References Cited

U.S. PATENT DOCUMENTS

| | | | |
|---|---|---|---|
| 2,907,241 A | 10/1959 | Lazar | |
| 3,135,147 A | 6/1964 | Curtis et al. | |
| 3,136,040 A | 6/1964 | Bauer et al. | |
| 3,538,585 A | 11/1970 | Hendry et al. | |
| 3,614,824 A | 10/1971 | Moulin | |
| 3,698,058 A | 10/1972 | Reimer et al. | |
| 3,742,573 A | 7/1973 | Kaufman | |
| 3,789,484 A | 2/1974 | Morgan | |
| 3,811,168 A | 5/1974 | Anderson et al. | |
| 4,168,569 A * | 9/1979 | Fairbairn | B25B 27/02 29/758 |
| 4,498,233 A | 2/1985 | Simms | |
| 4,864,719 A | 9/1989 | Rudy, Jr. et al. | |
| 5,890,271 A * | 4/1999 | Bromley | B25B 27/28 29/263 |
| 6,067,705 A | 5/2000 | Boyde et al. | |
| 6,098,276 A | 8/2000 | Espiritu | |

(Continued)

*Primary Examiner* — Lee D Wilson

(57) ABSTRACT

A resetting tool comprising an elongate housing having first and second ends, and defining a longitudinal channel. The first end can comprise first opposing flex members that are compliant, and the longitudinal channel can comprise a tapered portion about the second end. A movable rod is slidable bi-directionally within the longitudinal channel, and has a first end portion operable to cause the first opposing flex members to transition from a retracted position to an extended position to reset a female electrical contact. The movable rod has a second end portion comprising second opposing flex members operable to slide through the tapered portion to cause the second opposing flex members to transition from an extended position to a retracted position to reset a male electrical contact. The resetting tool operates from a mating side of the respective connectors in support of the male and female electrical contacts.

19 Claims, 14 Drawing Sheets

(56) References Cited

U.S. PATENT DOCUMENTS

| | | | | |
|---|---|---|---|---|
| 7,010,840 | B2 * | 3/2006 | Reale | B25B 27/062 29/255 |
| 2020/0194953 | A1 * | 6/2020 | Rubin | H01R 43/22 |

* cited by examiner

CONNECTOR ELECTRICAL CONTACT RE-SETTING TOOL

BACKGROUND

Electronics assemblies and devices often comprise electrical connectors for connecting electronic devices together, such as for power and/or data transfer. Such electrical connectors typically comprise a set of male electrical contacts or female electrical contacts that mate with opposing male or female contacts. Oftentimes, one or more of such contacts are inadvertently displaced within their connector structure (e.g., pushed down) due to the axial force exerted on the contact when being mated to an opposing contact. They can also become displaced if the opposing male and female contacts are slightly misaligned relative to each other, such that one contact pushes the opposing contact back into the supporting connector structure.

If a particular contact becomes displaced for whatever reason, it may not appropriately mate with its opposing contact when the opposing connector structures are coupled together, and thereby the electronics devices electrically coupled to the contacts may not work properly. Thus, it is critical that any displaced contacts be reset to their desired, original position so that they work as intended. However, resetting a displaced contact from a wiring side of the contact is not always feasible or possible without disassembling the electronics assembly to gain access to the wiring side to push the contact back into place. In some cases, disassembling the electronics assembly can void a warranty associated with the electronics assembly.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
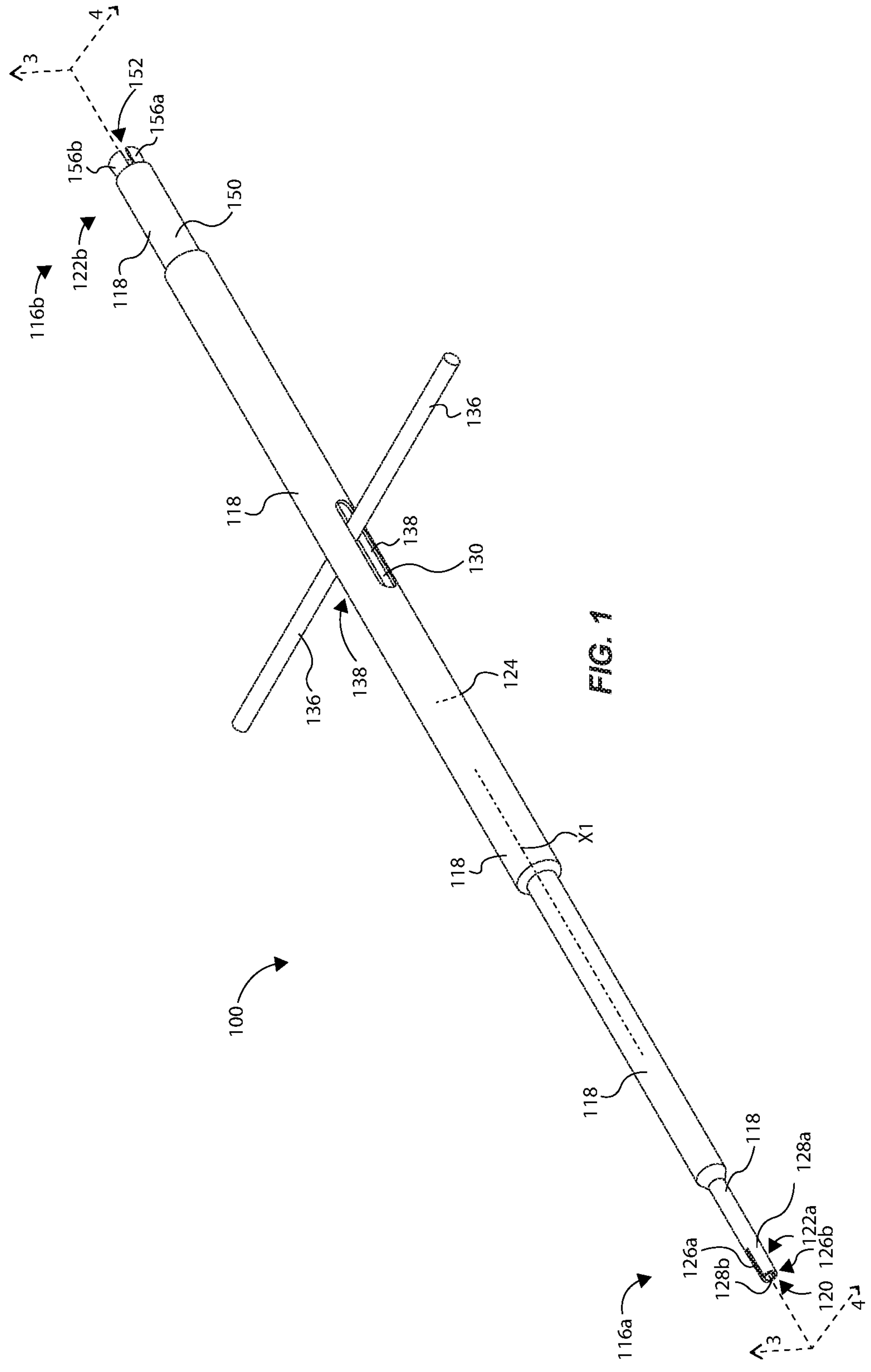
FIG. 1 is an isometric view of a resetting tool in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term “substantially” refers to the complete or nearly complete extent or degree of an action, characteristic, property, state, structure, item, or result. For example, an object that is “substantially” enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of “substantially” is equally applicable when used in a negative connotation to refer to the complete or near complete lack of an action, characteristic, property, state, structure, item, or result.

As used herein, “adjacent” refers to the proximity of two structures or elements, Particularly, elements that are identified as being “adjacent” may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

Based on the issues described above, it is desirable to reset displaced electrical contacts from the mating side of the connectors from which they are supported and extend from to avoid damaging the electrical contacts during the resetting process. The present disclosure sets forth a resetting tool for resetting a position of a female electrical contact of a connector from a mating side of the connector in support of one or more female electrical contact. The resetting tool comprises an elongate housing comprising an opening about a first end, and a longitudinal channel extending from the opening at least part way through the elongate housing. At least one slot is formed in the elongate housing, and extends from the opening so as to define opposing flex members formed on an inward taper with respect to the elongate housing, such that the opposing flex members fit within a female electrical contact. A movable rod is supported within the elongate housing, and is slidable bi-directionally within the longitudinal channel. The moveable rod can have an end portion operable to slide about the opposing flex members to cause the opposing flex members to transition from a retracted position to an extended position, wherein, in the extended position, the opposing flex members are operable to apply a compression force on a female electrical contact to facilitate resetting of the female electrical contact. During application of the compression force, the elongate housing is operable to be moved away from the connector structure to reset a position of the female electrical contact when transitioning to the extended position.

The present disclosure sets forth a resetting tool for resetting a position of a male electrical contact of a connector from a mating side of the connector in support of the male electrical contact. The resetting tool comprises an elongate housing comprising an opening about a first end, and defines a longitudinal channel extending from the opening. The longitudinal channel comprises a tapered portion about the first end. A movable rod is supported within the elongate housing, is slidable bi-directionally within the longitudinal channel of the elongate housing, and comprises an opening and a flex channel extending from the opening. The movable rod further comprises at least one slot formed in the movable rod about the flex channel, and extends from the opening of the movable rod so as to define opposing flex members operable to transition from an extended position to a retracted position. The movable rod is slidable bi-directionally within the longitudinal channel, such that the opposing flex members slide through the tapered portion to cause the opposing flex members to transition from an extended position to a retracted position to apply a compression force to a male electrical contact. During application of the compression force, the movable rod is operable to be moved away from the connector structure to reset a position of the male electrical contact when transitioning to the retracted position.

The present disclosure sets forth a resetting tool operable to reset a male electrical contact of a connector structure, and a female electrical contact of a mating connector structure, the resetting tool comprising an elongate housing comprising a first end and a second end, and defines a longitudinal channel extending between the first and second ends. The first end comprises first opposing flex members formed on an inward taper and configured to fit within a female electrical contact. The longitudinal channel comprises a tapered portion about the second end. A movable rod can be supported within the elongate housing, and is slidable bi-directionally within the longitudinal channel. The moveable rod has a first end portion operable to cause the first opposing flex members to transition from a retracted position to an extended position to facilitate application of an outward compression force to a female electrical contact, and resetting of a position of the female electrical contact. The movable rod has a second end portion comprising second opposing flex members operable to slide through the tapered portion of the longitudinal channel of the elongate housing to cause the second opposing flex members to transition from an extended position to a retracted position to facilitate application of an inward compression force to a male electrical contact, and resetting of a position of the male electrical contact. The resetting tool is operable to reset the positions of the female and male electrical contacts from a mating side of each of the respective connectors in support of the female and male electrical contacts.

The present disclosure sets forth a method of making a resetting tool operable to reset a position of a female electrical contact of a connector structure from a mating side of the connector in support of the female electrical contact. The method comprises forming an elongate housing comprising a longitudinal channel, and a first end having first opposing flex members formed on an inward taper with respect to the elongate housing, such that the first opposing flex members fit within a female electrical contact. The method can comprise forming a movable rod having an end portion. The method can comprise positioning the movable rod within the longitudinal channel of the elongate housing, such that the movable rod is slidable bi-directionally within the longitudinal channel. The end portion of the moveable rod is operable to slide about the first opposing flex members to cause them to transition from a retracted position to an extended position to apply a compression force to the female electrical contact and to reset a position of the female electrical contact.

The present disclosure sets forth a method of making a resetting tool operable to reset a position of a male electrical contact of a connector structure from a mating side of the connector in support of the male electrical contact. The method can comprise forming an elongate housing comprising a longitudinal channel comprising a tapered portion about a first end of the elongate housing. The method can comprise forming a movable rod comprising an opening and a flex channel extending from the opening, and forming at least one slot along the flex channel so as to define opposing flex members. The method can comprise positioning the movable rod within the longitudinal channel of the elongate housing, such that the movable rod is slidable bi-directionally within the longitudinal channel. The opposing flex members are operable to slide about the tapered portion to cause the opposing flex members to transition from between extended and retracted positions to apply a compression force to the male electrical contact and to reset a position of the male electrical contact.

The present disclosure sets forth a method of resetting a position of a female electrical contact comprising providing a resetting tool comprising an elongate housing defining a longitudinal channel and having a first end having opposing flex members. The resetting tool can comprise a movable rod slidable bi-directionally within the longitudinal channel and having an end portion. The method can comprise positioning the end portion of the movable rod axially away from the opposing flex members, such that the opposing flex members are in a retracted position. The method can comprise inserting at least a portion of the opposing flex members into a female electrical contact, the female electrical contact being supported by a connector structure and in a displaced position. The method can comprise sliding the moveable rod and the elongate housing axially relative to one another to slide the movable rod axially through the longitudinal channel, such that the end portion of the movable rod slides along the opposing flex members to cause them to transition from the retracted position to apply a compression force to the female electrical contact. The method can comprise moving the elongate housing and the movable rod axially away from the connector structure to pull the female electrical contact to reset the female electrical contact from the displaced position to a reset position in the connector structure.

The present disclosure sets forth a method of resetting a position of a male electrical contact comprising providing a resetting tool comprising an elongate housing having a longitudinal channel. The longitudinal channel comprises a tapered portion about a first end of the elongate housing, and the resetting tool comprises a movable rod slidable bi-directionally within the longitudinal channel and having opposing flex members at a first end. The method can comprise positioning the opposing flex members in an extended position and through the tapered portion of the longitudinal channel. The method can comprise positioning the opposing flex members around a male electrical contact (the male electrical contact can be supported by a connector structure and in a displaced position. The method can comprise sliding the moveable rod and the elongate housing axially relative to one another to slide the moveable rod axially through the longitudinal channel, such that the opposing flex members slide along the tapered portion to at least a partially retracted position to apply a compression force around the male electrical contact and to reset the male electrical contact from the displaced position to a reset position about the connector structure.

To further describe the present technology, examples are now provided with reference to the figures, FIG. 1 shows an example resetting tool 100 for resetting a position of electrical contacts, such as male and/or female electrical contacts supported by connector(s), from a mating side of the connector(s) in support of the electrical contacts. It is common for electrical contacts to become inadvertently moved or forced to a displaced position within their connector. Displacement of one or more electrical contacts within a connector can result from multiple connector coupling operations, and the repeated axial forces exerted on the electrical contact (e.g., male contact) when mated to a corresponding electrical contact (e.g., female contact). Displacement can also result from misalignment of mating connector contacts, where, if misaligned, even a single instance of coupling connector portions can cause the displacement. Indeed, the electrical contacts can also become moved to a displaced position if the male and female contacts are slightly misaligned relative to each other during mating, wherein the male and/or female contacts can potentially push each other into the connector and into a displaced position. If a particular contact becomes displaced, it may not appropriately mate with a corresponding contact when the connectors are coupled together, and thereby the electronics devices coupled to the electrical contacts may not work appropriately. Thus, any displaced contact must be reset prior to being mated to a corresponding contact of another connector.

Figure 2A:
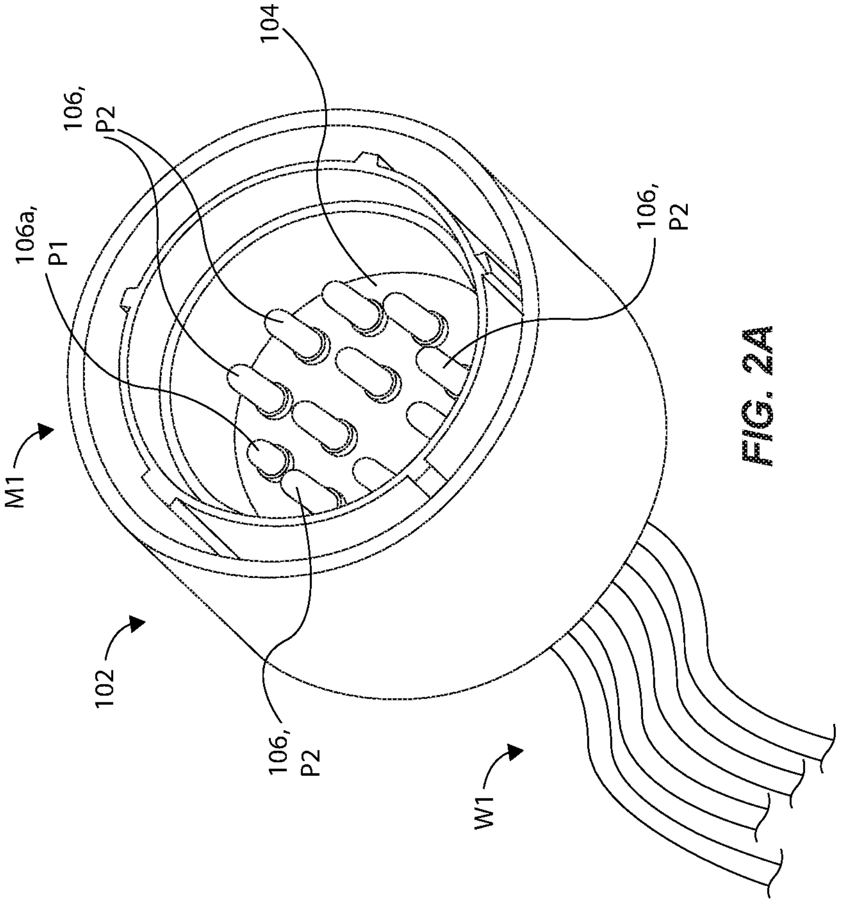
FIG. 2A is an isometric view of a connector having male electrical contacts that can be reset by the resetting tool of FIG. 1.
Figure 8A:
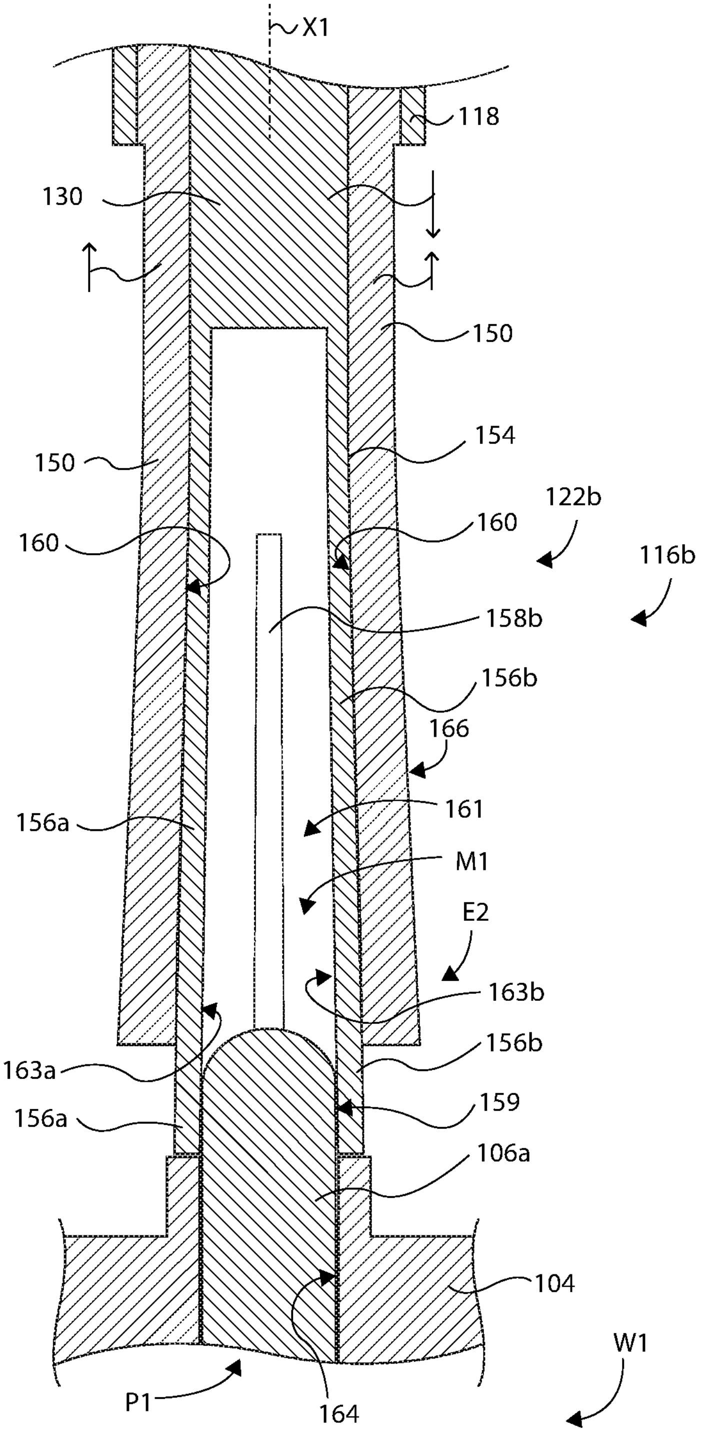
FIG. 8A is a cross sectional view of FIG. 7A, taken along lines 8A-8A, and showing the second end situated around the male electrical contact of FIG. 2A, showing male electrical contact in a displaced position.
Figure 8B:
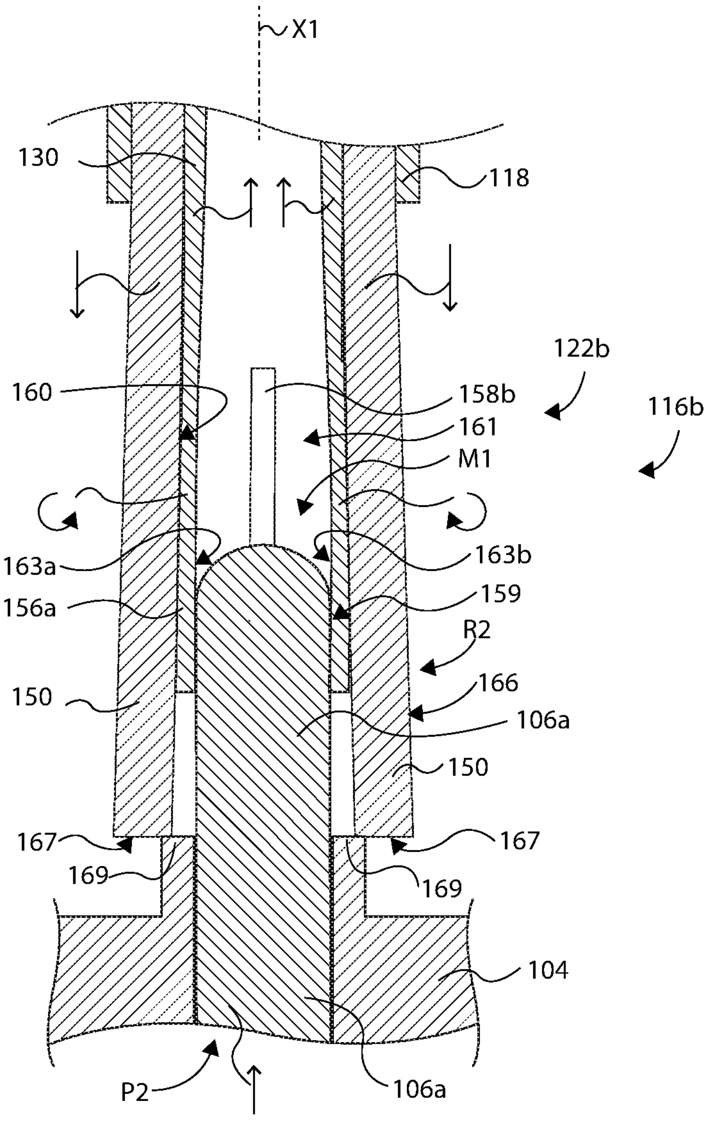
FIG. 8B is a cross sectional view of FIG. 8A, showing the resetting tool resetting the male electrical contact from the displaced position of FIG. 8A to the reset position of FIG. 8B.

For example, FIG. 2A shows a first connector 102 comprising a connector structure 104 supporting a plurality of male electrical contacts 106 in a set position P2. The first connector 102 can include a mating side M1 and a wiring side W1. That is, the wiring side W1 includes wires or a wiring harness leading into or coupled to back sides or ends of the male electrical contacts 106, while the mating side M1 includes exposed tips or ends of the male electrical contacts 106 used for mating to corresponding female/socket electrical contacts (e.g., like the female/socket contacts of FIG. 2B). As shown in FIG. 2A, one particular male electrical contact **106*a* is in a displaced position P1, meaning that it has been axially pushed downwardly to some degree or distance into the supporting connector structure 104 out of the set position P2, and therefore needs to be reset to a reset position P2 (this being the same as the set position) before attempting to be mated to a female electrical contact. See also FIGS. 8A and 8B, showing the male electrical contact 106*a* moved from the displaced position P1 (FIG. 8A) to a set or reset position P2 (FIG. 8B) by the resetting tool 100, as further detailed below. See also an alternative approach regarding FIGS. 9A and 9**B, as further detailed below.

Figure 2B:
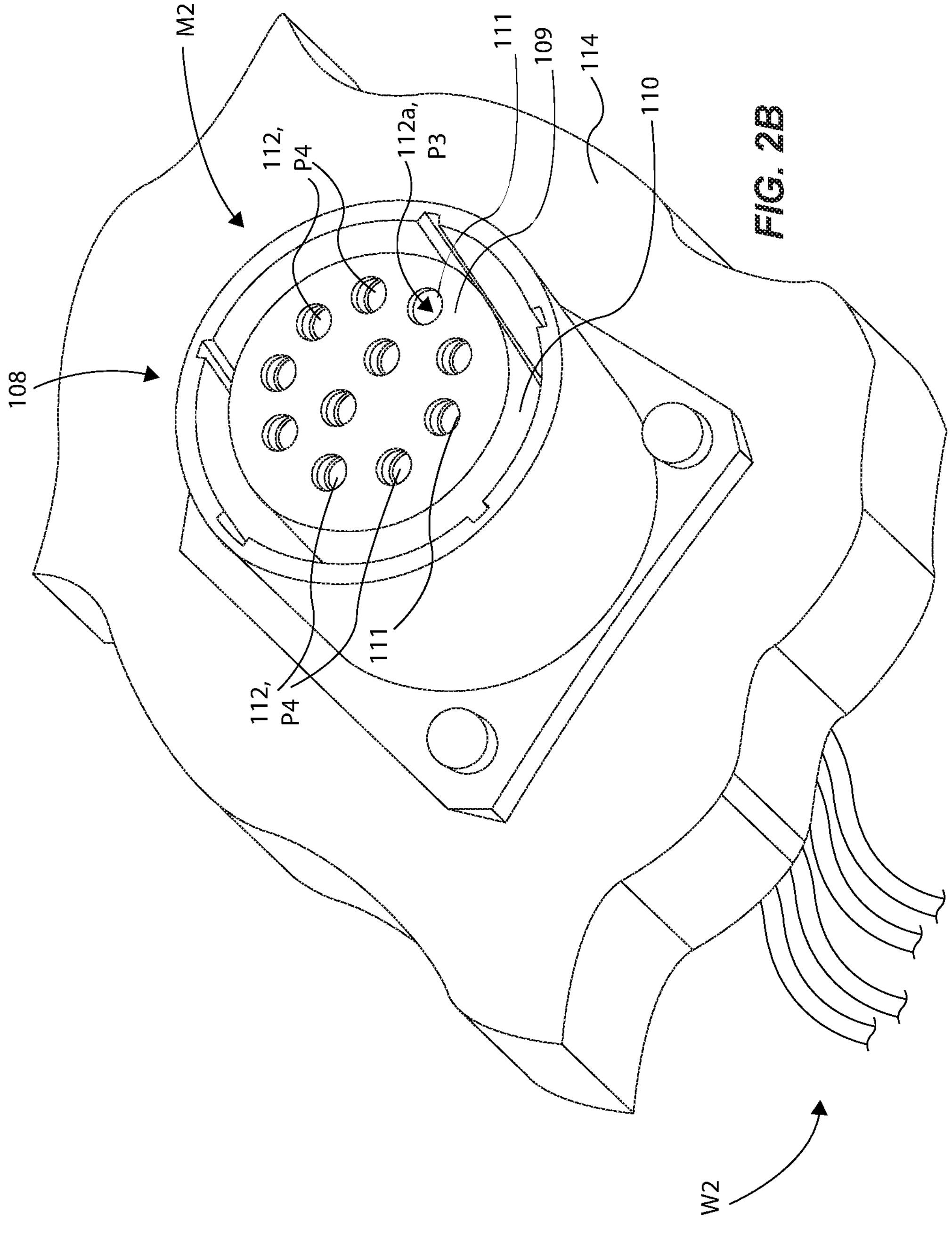
FIG. 2B is an isometric view of a connector having female electrical contacts that can be reset by the resetting tool of FIG. 1.
Figure 6A:
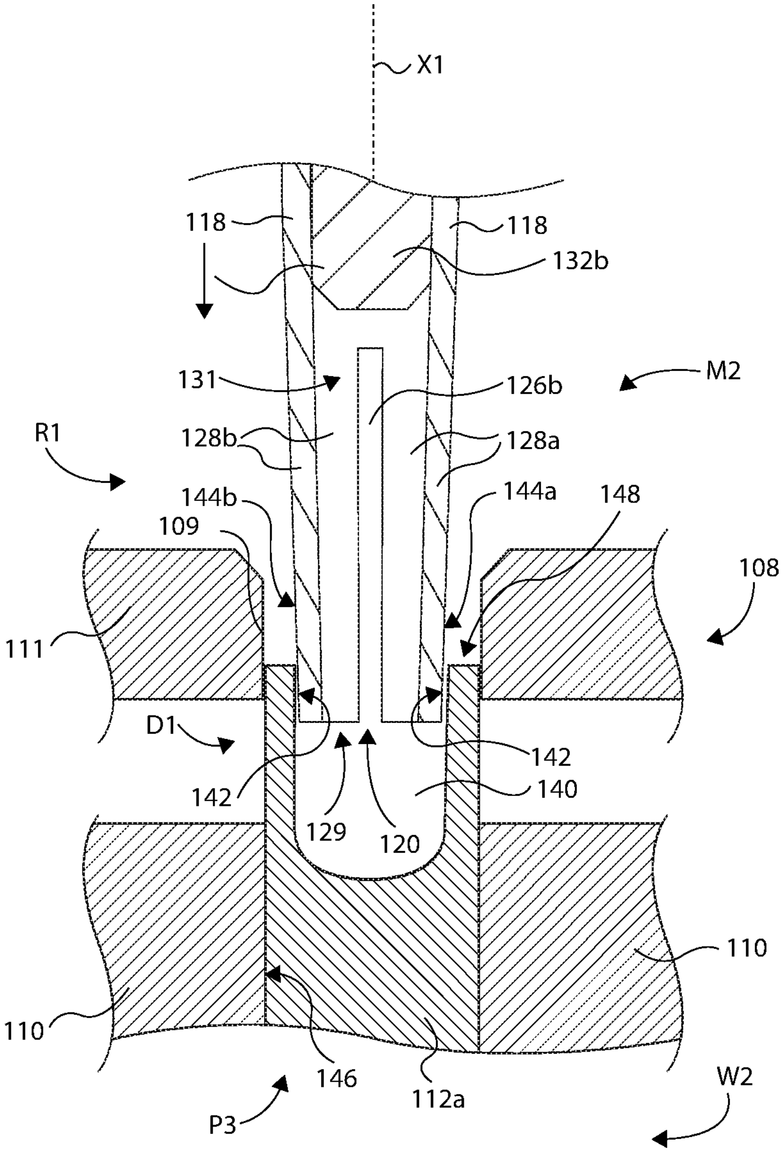
FIG. 6A is a cross sectional view of FIG. 5A, taken along lines 6A-6A, and showing the first end inserted into the female electrical contact of FIG. 2B, showing female electrical contact in a displaced position.
Figure 6B:
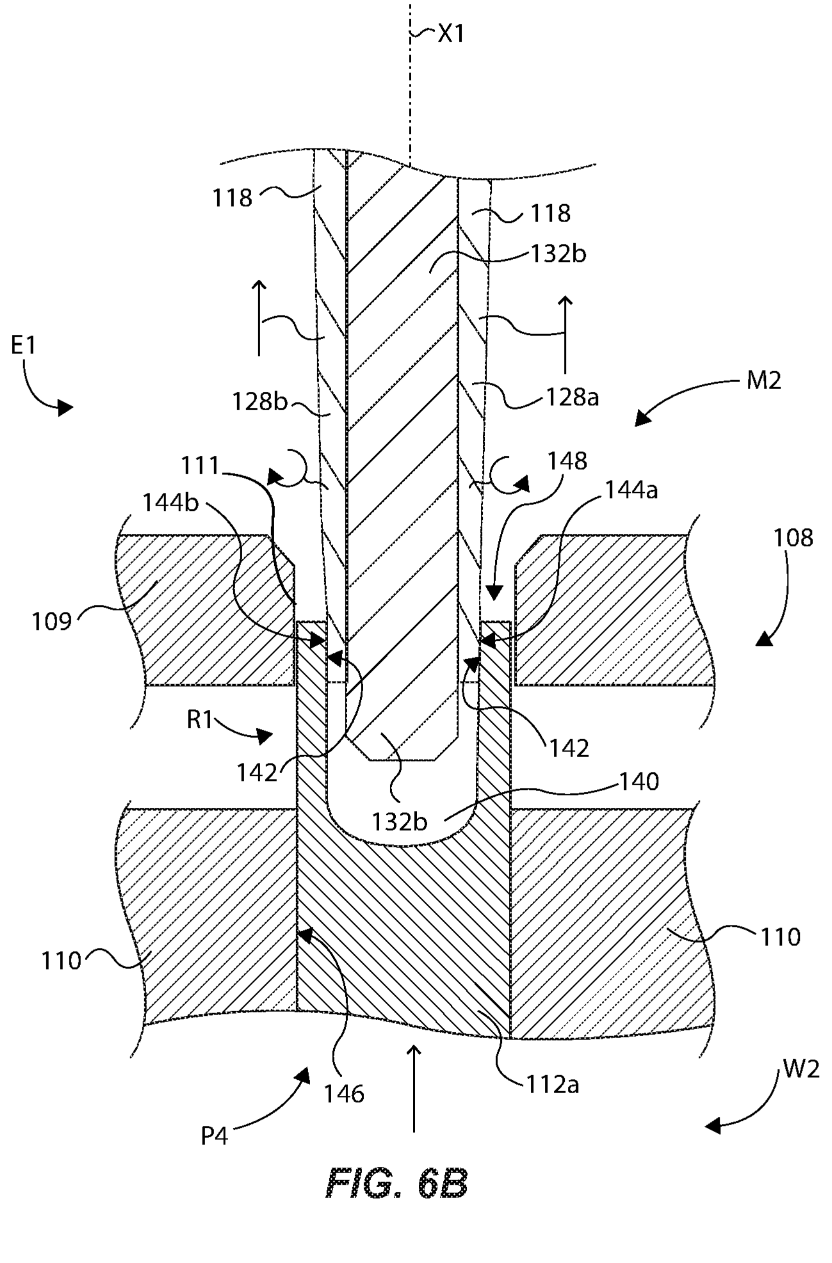
FIG. 6B is a cross sectional view of FIG. 6A, showing the resetting tool resetting the female electrical contact from the displaced position of FIG. 6A to the reset position of FIG. 6B.

Further to the concept of resetting electrical contacts, FIG. 2B shows a second connector 108 comprising a connector structure 110 supporting a plurality of socket or female electrical contacts 112 in a set position P4. The second connector 108 can be mounted to a structure 114 (e.g., a connector housing) that may be part of an electronics assembly or device, such as an electronics assembly with bulkhead/pass through type connectors that are typically used in military, industrial, aerospace, automotive and marine industries. The second connector 108 can include a mating side M2 and a wiring side W2. That is, the wiring side W2 includes wires or a wiring harness leading into and coupled to back sides or ends of the female electrical contacts 112, while the mating side M2 includes exposed openings or ends of the female electrical contacts 112 for mating to male electrical contacts (e.g., FIG. 2A). As shown, one particular female electrical contact **112*a* is in a displaced position P3 (out of sight from the view of FIG. 2B), meaning that it has been axially pushed downwardly to some degree or distance into the supporting connector structure 110 out of the set position P4, and therefore needs to be reset to a reset position P4 (which is the same as the set position). See FIGS. 6A and 6B, showing the female electrical contact 112*a* moved from the displaced position P3 (FIG. 6A) to the set or reset position P4 (FIG. 6B) by the resetting tool 100**, as further detailed below.

Note that the first connector 102 can also be mounted to a structure (e.g., 114) of an electronics assembly or device in some examples the same or similar to those discussed above. Because the first and/or second connectors 102 and 108 can be mounted to an electronics assembly of a larger system (e.g., a missile, vehicle, sensor, etc.), when the electrical contacts become displaced, it is often unfeasible or undesirable to access the electrical contacts from the wiring side (e.g., W1, W2) because it can be difficult to gain access to such wiring side, and/or it can void the warranty of the device or system if the larger device/system is disassembled and accessed from the wiring side. Accordingly, it is desirable (and required in some cases) to be able to reset male and/or female electrical contacts from the mating side (e.g., M1, M2). It is also desirable to reset the positions of such contacts without damaging (scratching, crushing, bending, etc.) the contacts, because otherwise they may not make appropriate electrical and mechanical contact between each other when mated in the male/female coupling Such potential damage can also negatively affect operation of the electronics assembly.

Figure 3:
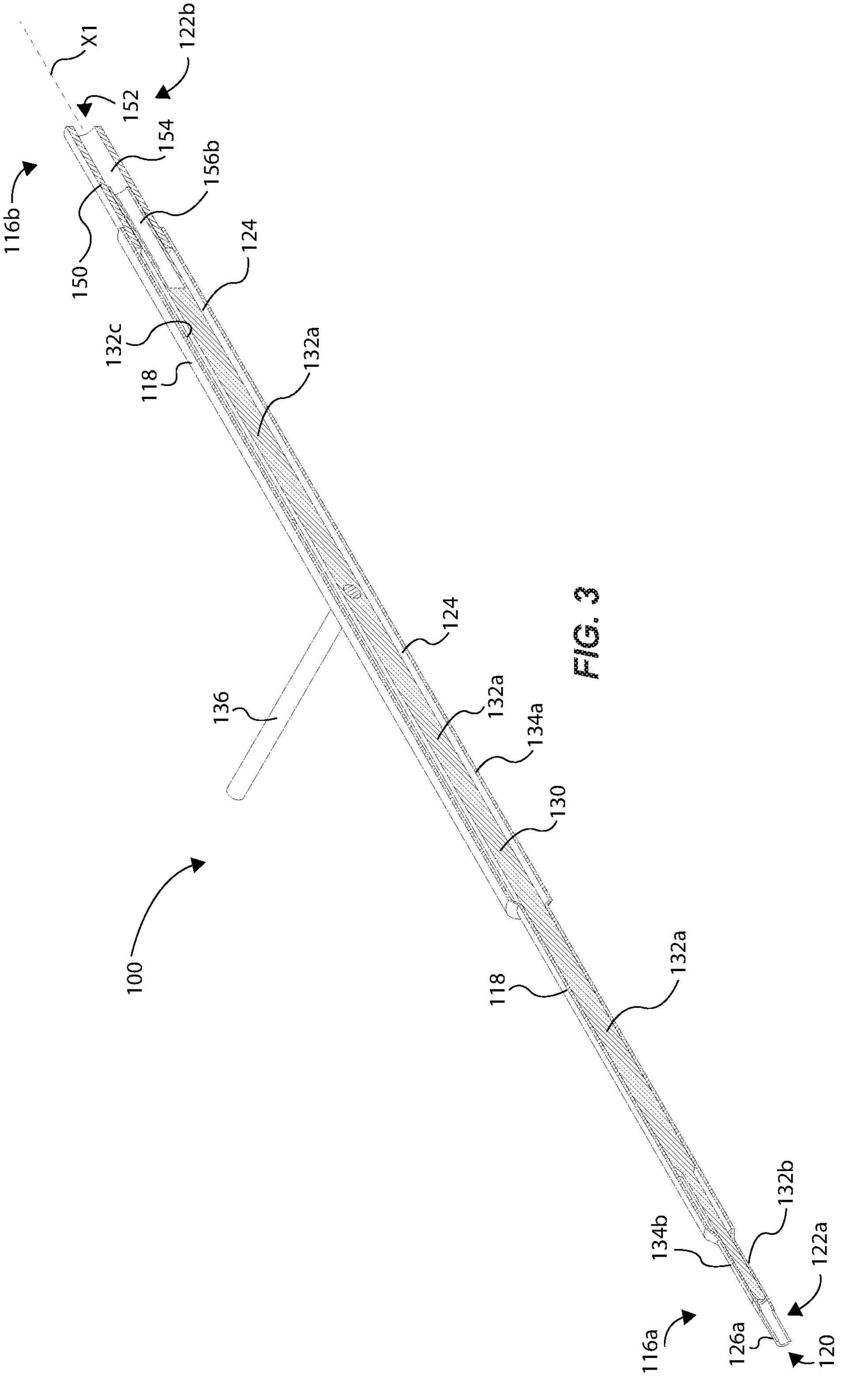
FIG. 3 is an isometric cross sectional view of the resetting tool of FIG. 1, and taken across lines 3-3, and showing a second end of the resetting tool in a retracted position, as shown in FIG. 7B.
Figure 4:
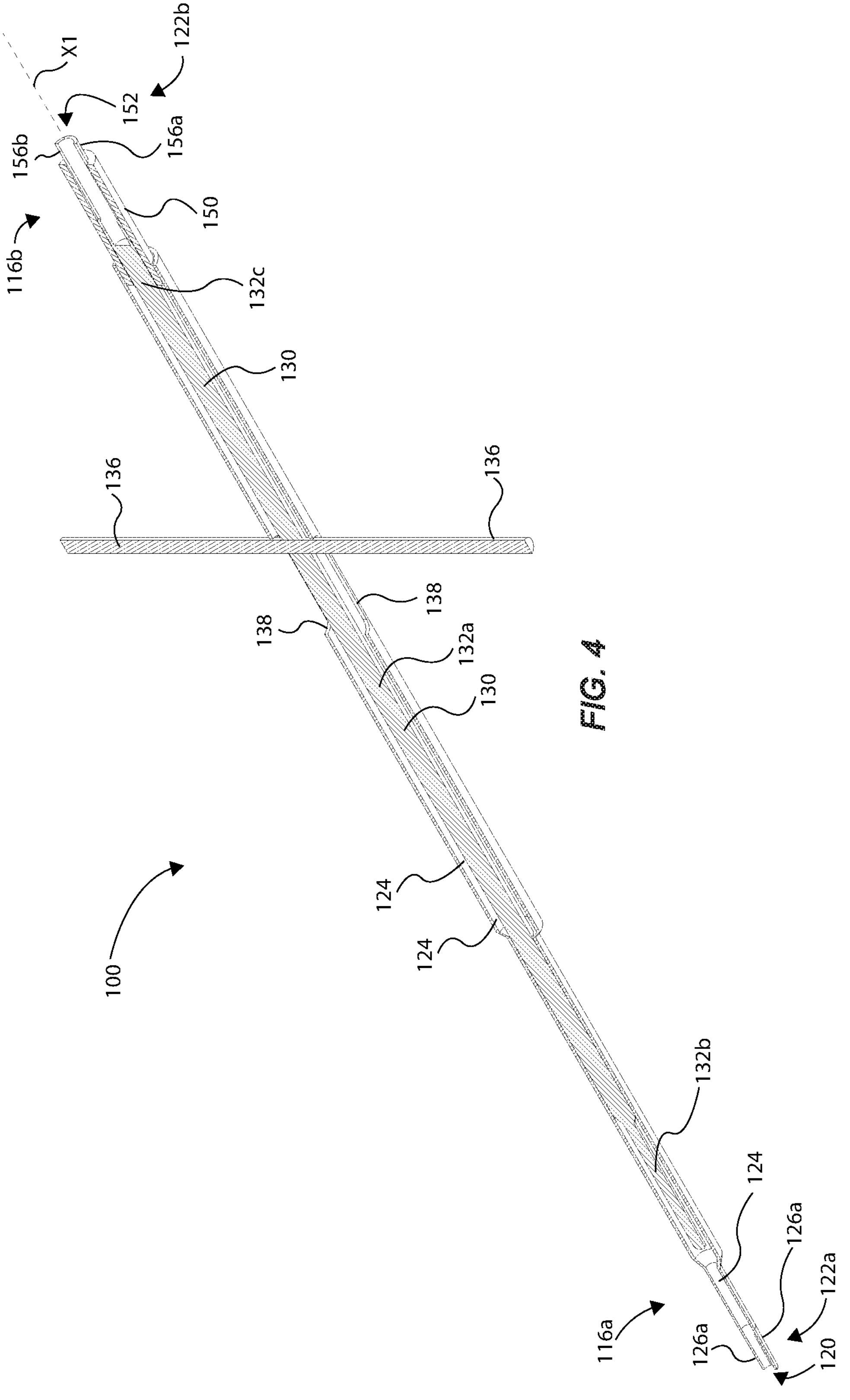
FIG. 4 is an isometric cross sectional view of the resetting tool of FIG. 1, and taken across lines 4-4, and showing a second end of the resetting tool in an extended position, as shown in FIGS. 1 and 7A.
Figure 9A:
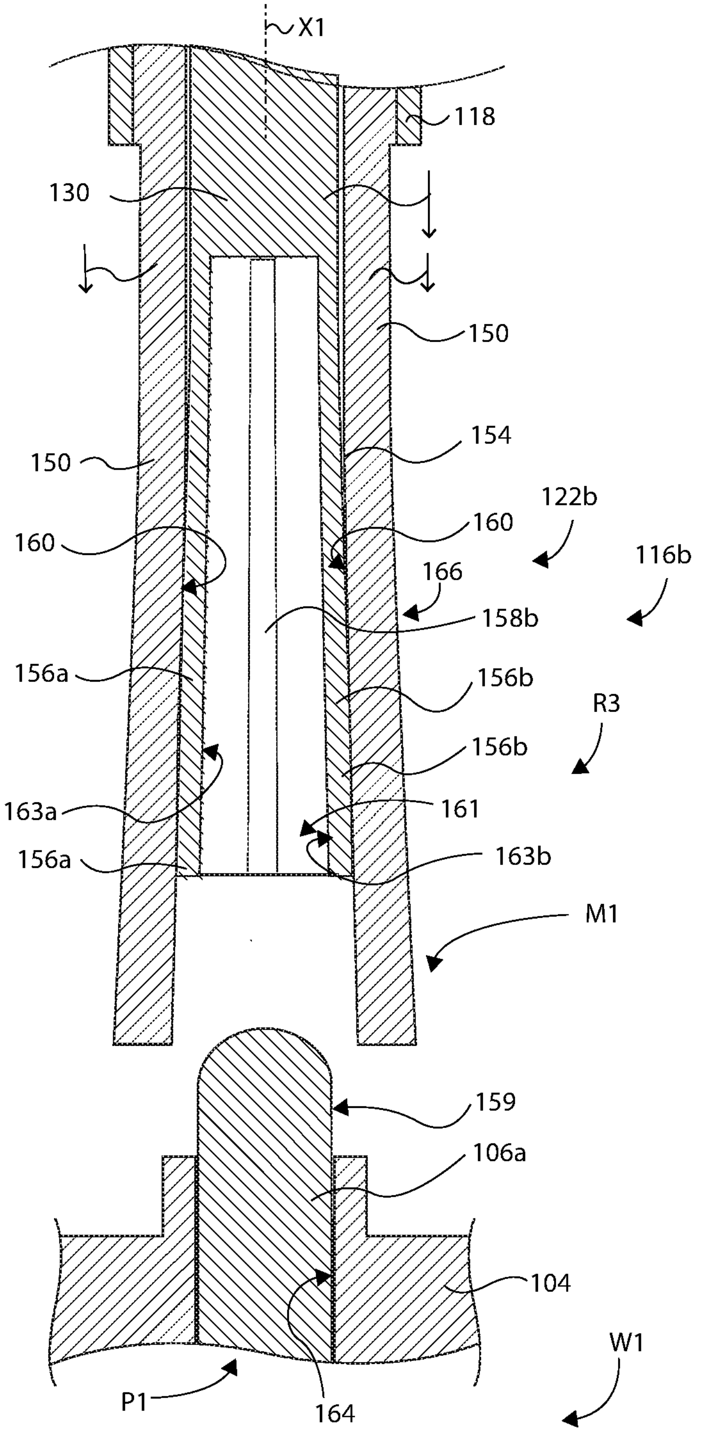
FIG. 9A is a cross sectional view of an alternative of the operations of FIGS. 8A and 8B, and showing male electrical contact in a displaced position.
Figure 9B:
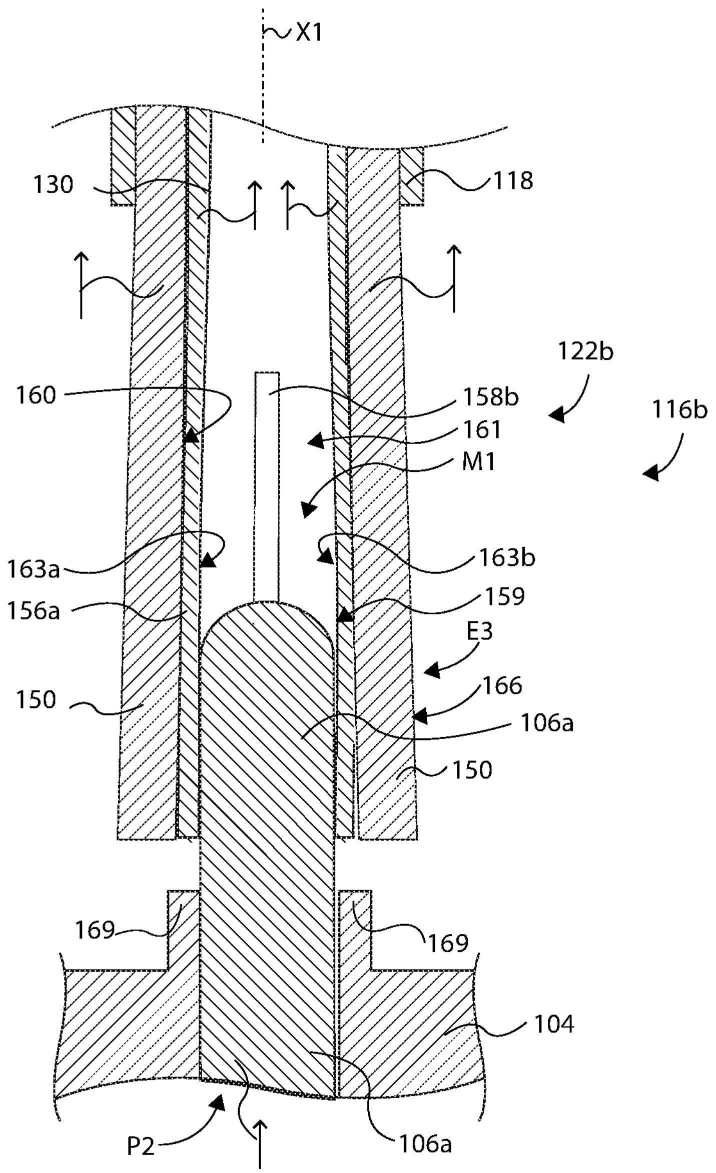
FIG. 9B is the cross sectional view of FIG. 9A, showing the resetting tool resetting the male electrical contact from the displaced position of FIG. 9A to the reset position of FIG. 9B.

Accordingly, the resetting tool 100 is provided to reset male and female electrical contacts (e.g., **106*a* and 112*a***)

from the mating side (e.g., M1, M2), and while eliminating or reducing the likelihood of damaging the contacts when being reset. More specifically, as shown in FIGS. 1, 3, and 4, the resetting tool 100 can comprise a first side 116*a* operable to reset a female electrical contact (e.g., 112*a*) from a displaced position (FIGS. 2B and 6A) to a reset position (FIG. 6B). The resetting tool 100 can also comprise a second side 116*b* operable to reset a male electrical contact (e.g., 106*a*) from a displaced position (FIGS. 2B,8A, and 9A) to a reset position (FIGS. 8B and 9B).

The resetting tool 100 can comprise an elongate housing 118 comprising a first end 122*a* and a second end 122*b*. An opening 120 can be formed at the first end 122*a*. The elongate housing 118 can define a longitudinal channel 124 extending from the opening 120 through some or all of the length of the elongate housing 118. The first end 122*a* can have first and second slots 126*a* and 126*b* formed axially through the elongate housing 118, and that extend from the opening 120 a distance so as to define a first pair of opposing flex members 128*a* and 128*b*. The first pair of opposing flex members 128*a* and 128*b* can be formed on an inward taper with respect to a longitudinal axis X1 of the elongate housing 118, such that the first pair of opposing flex members 128*a* and 128*b* can fit within a female electrical contact (see e.g., FIG. 6A) when in a retracted position, as further detailed below. Thus, due to this inward taper and the design of the slots 126*a* and 126*b*, the first pair of opposing flex members 128*a* and 128*b* are compliant, meaning that they can flex or bend about or proximate inner termination ends of the slots 126*a* and 126*b* (the end of the slots that are the furthest from the opening 120).

The resetting tool 100 can further comprise a movable rod 130 supported within the elongate housing 118. The movable rod 130 can be slidable bi-directionally within the longitudinal channel 124. The movable rod 130 can comprise a middle portion 132*a* that extends along a majority of the length of the movable rod 130. A first end portion 132*b* of the movable rod 130 can extend from the middle portion 132*a* toward the opening 120, and can have a smaller diameter than the middle portion 132*a*. Accordingly, the longitudinal channel 124 can have a middle channel section 134*a* that slidably receives the middle portion 132*a* of the movable rod 130, and an end channel section 134*b* that slidably receives the first end portion 132*b* of the movable rod 130. Alternatively, the longitudinal channel and the movable rod can each have a constant or uniform cross sectional area along their lengths.

A handle 136 can be supported by or coupled to the movable rod 130 for translating the movable rod 130 bi-directionally within the elongate housing 118. Opposing handle slots 138 can be formed axially through the elongate housing 118 for facilitating (and limiting) movement of the handle 138 (and therefore the movable rod 130) along the elongate housing 118 when moved bi-directionally.

In operation of the first side 116*a*, and with particular reference to FIGS. 5A-6B, the moveable rod 130, and more particularly the first end portion 132*b* of the movable rod 130, is operable to slide about the first opposing flex members 128*a* and 128*b*, which action causes them to transition from a retracted position R1 (FIGS. 5A and 6A) to an extended position E1 (FIGS. 5B and 6B) for resetting a position of the female electrical contact 112*a* (FIG. 2B). More specifically, as shown in FIG. 6A, the female electrical contact 112*a* can comprise a socket area 140, which can be partially defined by an inner radial surface 142, such as with traditional female socket contacts. Because the first opposing flex members 128*a* and 128*b* are formed on an inward taper, and with the first pair of opposing flex members 128*a* and 128*b* in the retracted position R1, a tip area or section 129 of the first pair of opposing flex members 128*a* and 128*b* can be inserted into and fit within the socket area 140, while the first end portion 132*b* of the movable rod 130 is retracted into a flex channel 131 defined by and forward of the first pair of opposing flex members 128*a* and 128*b*. Meanwhile, the female electrical contact 112*a* is in the displaced position P3 in the second connector structure 110, as a result of one of the reasons discussed above, for example. Once the first opposing flex members 128*a* and 128*b* are inserted into and fit within the socket area 140 a sufficient distance so that they are adjacent to or in contact with and slightly biased to the inner radial surface 142 of the female electrical contact 112*a*, the movable rod 130 can be actuated and moved axially (downwardly in this case and in this view) toward the female electrical contact 112*b* relative to the elongate housing 118, as shown in FIG. 6B, by engaging and moving the handle 136 toward the female electrical contact 112*b*. As a result of such motion, the first end portion 132*b* of the movable rod 130 moves axially through the flex channel 131 and slides along inner surfaces of the first pair of opposing flex members 128*a* and 128*b*, which causes them to flex or pivot outward relative to the longitudinal axis X1, thereby increasing a diameter or area or profile defined by the first opposing flex members 128*a* and 128*b* about opening 120. As a result, outer curved or radial surfaces 144*a* and 144*b* of the first opposing flex members 128*a* and 128*b* are caused to compress (i.e., apply a force) outwardly against the inner radial surface 142 of the female electrical contact 112*a*. Concurrently (or sequentially), the elongate housing 118 can be moved axially (upwardly in this view) by a user away from the connector structure 110 (while the compression force applied to the female electrical contact 112*a* is maintained), with sufficient force such that the female electrical contact 112*a* is caused to move or slide (upwardly) through a support opening 146 of the connector structure 110, and from the displaced position P3 of FIG. 6A to the reset position P4 of FIG. 6B.

Figures 5A, 5B:
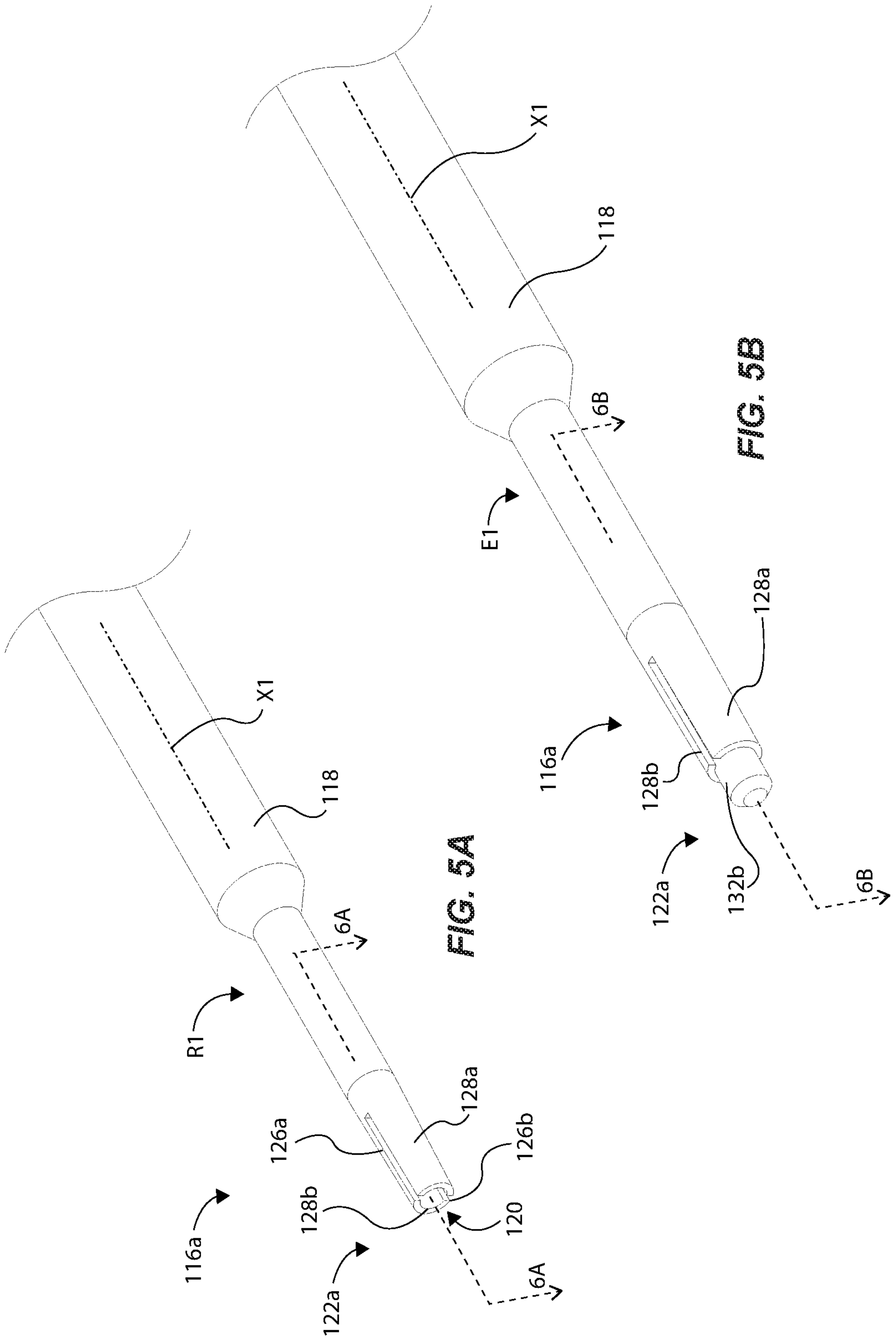
FIG. 5A is an isometric view of a first end of the resetting tool of FIG. 1, showing the first end in a retracted position, as also shown in FIG. 6A, for resetting a female electrical contact.
FIG. 5B is an isometric view of the first end of the resetting tool of FIG. 5A, showing the first end in an extended position, as also shown in FIG. 6B, for resetting the female electrical contact.

In one example, the elongate housing 118 can be comprised of a metallic material, and the inward taper of the first opposing flex members 128*a* and 128*b* can be formed by heat treating them when held in an inward tapered manner, so that when cooled, the first opposing flex members 128*a* and 128*b* are set to the inward taper configuration so that they can bend or flex outwardly when slidably engaged by the end portion 132*b* of the movable rod 130 as discussed herein. In another example, the elongate housing 118 can be formed of a rigid or semi-rigid composite, plastic, polymer, etc., through injection molding, 3D printing, and other suitable methods of manufacture. In this way, the first opposing flex members 128*a* and 128*b* can be molded or formed to comprise an inward taper, such as illustrated in FIG. 5A. Other ways of forming the first opposing flex members 128*a* and 128*b* will be apparent to those skilled in the art, and thus, the examples discussed above are not intended to be limiting in any way.

The second connector 108 can comprise an upper plate 109 (FIGS. 2B and 6B) that includes a pass through aperture 111 sized slightly larger than the diameter of the female electrical contact 112*a*, so that an upper or distal end (the end intended to connect with a mating male electrical contact) of the female electrical contact 112*a* can be moved through and situated within the aperture 111 when being reset. Note that the connector structure 110 can comprise a recess or bore (not shown) on a backside that receives/seats a flange (not shown) on the bottom of the female electrical contact when in the proper, reset position P4 of FIG. 6B. The same may be true for the male electrical contact for proper seating to its connector structure when re-set, as discussed below regarding FIG. 8B. In other words, the male and female electrical contacts or their respective connector structures, or both, can comprise some type of joining or seating system or interface that allows the male and female electrical contacts to be reset into a proper position with respect to their respective connector structures when being manipulated using the resetting tool.

After the female electrical contact 112*a* has been reset to its proper position, the movable rod 130 can be retracted back into the elongate housing 118 by moving the handle 136 relative to the elongate housing 118 in an opposing direction, thereby placing the first side 116*a* in the retracted position R1 (see FIG. 5A). This slides and subsequently disengages the end portion 132*b* of the movable rod 130 from the inner surfaces of the first opposing flex members 128*a* and 128*b*. As a result, because of their compliant and flexible configuration, the first opposing flex members 128*a* and 128*b* automatically return to their normal or default or retracted position R1 (see FIGS. 5A and 6A). In this way, the first opposing flex members 128*a* and 128*b* can then be removed from the socket area 140 of the female electrical contact 112*a*, and then the resetting tool 100 is ready for another operation to reset another female electrical contact.

Notably, because of the curved or radial profile of the outer radial surfaces 144*a* and 144*b* of the first opposing flex members 128*a* and 128*b*, and because the first opposing flex members 128*a* and 128*b* oppose each other, a substantially uniform outward compression force can be applied to the inner radial surface 142 of the female electrical contact 112*a*. This allows the female electrical contact 112*a* to be aligned and pulled in an axial manner into a reset position P4, which better resets the female electrical contact 112*a* into its proper, re-set position because it reduces the likelihood of inadvertently rotating or twisting the female electrical contact 112*a* while being reset, which can cause damage or misalignment of the female electrical contact 112*a*. Such configuration also reduces or eliminates the likelihood of damaging or scratching the female electrical contact 112*a*, because the surface-to-surface contact is maximized in a radial direction between the female electrical contact 112*a* and the first opposing flex members 128*a* and 128*b*.

Notably, the first side 116*a* of the resetting tool 100 has a relatively low profile, so that it can be inserted into relatively small openings to gain access to female electrical contacts. Specifically, the outermost surfaces or profile of the first side 116*a* of the resetting tool 100 is the outer radial surfaces 144*a* and 144*b* of the first opposing flex members 128*a* and 128*b*, so that the first side 116*a* can fit past or through the apertures 111 of the second connector 108 and into the female electrical contact for resetting. This allows a user of the resetting tool 100 to gain access to tight areas or access openings (e.g., apertures 111), and from a mating side of the connector, to access and reset female electrical contacts. It is contemplated that the size and configuration of the various portions of the resetting tool 100 can vary depending upon the type, size and configuration of the connector to provide mating side resetting of electrical contacts.

With reference to FIGS. 1-4, the second side 116*b* is operable to reset a male electrical contact (e.g., 106*a* of FIG. 2A) from the displaced position P1 (e.g., FIGS. 2A and 8A) to the reset position P2 (e.g., FIGS. 2A and 8B). More particularly, the second side 116*b* of the resetting tool 100 can include the elongate housing 118 having a tapered portion 150 about the second end 122*b* and that can be formed as part of the elongate housing 118, or the tapered portion 150 can be a separate component attached to an end of the elongate housing 118. The tapered portion 150 can comprise an end opening 152, and can define a tapered flex channel 154 that is in fluid communication with the longitudinal channel 124 (note that the flex channel 154 can further define the longitudinal channel 124). The tapered flex channel 154 can be tapered or frustoconical from an inward or proximal end of the tapered portion 150 (i.e., the end toward or proximate the handle 136) to an outward or distal end of the tapered portion 150 defining the end opening 152, and that terminates at the end opening 152.

Figure 7B:
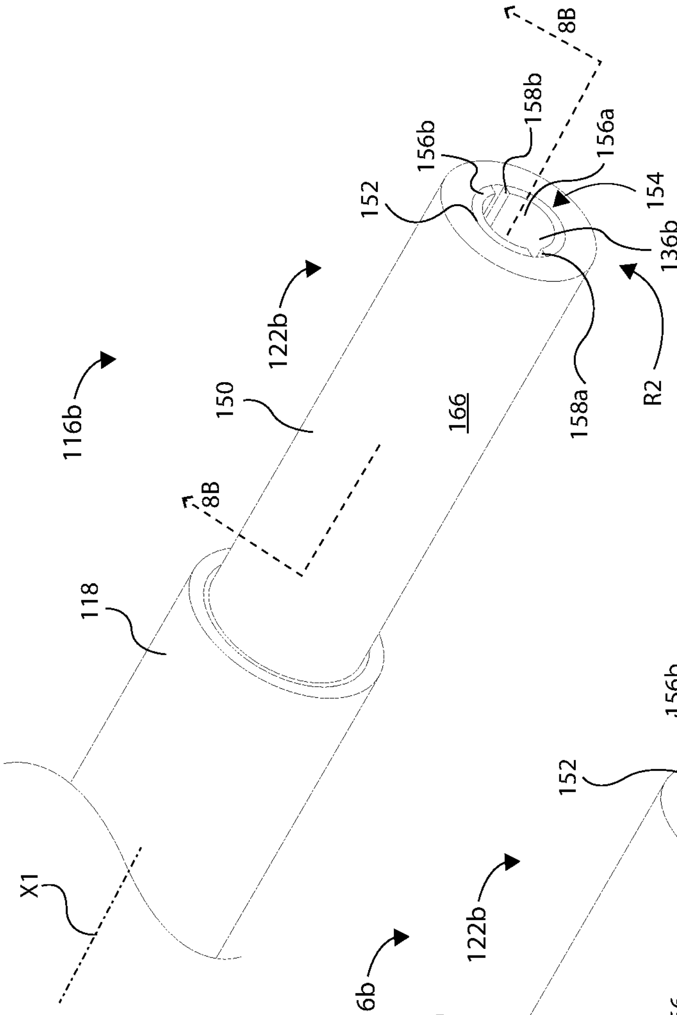
FIG. 7B is an isometric view of the second end of the resetting tool of FIG. 7A, showing the second end in an extended position, as also shown in FIG. 8B, for resetting the male electrical contact.
Figure 7A:
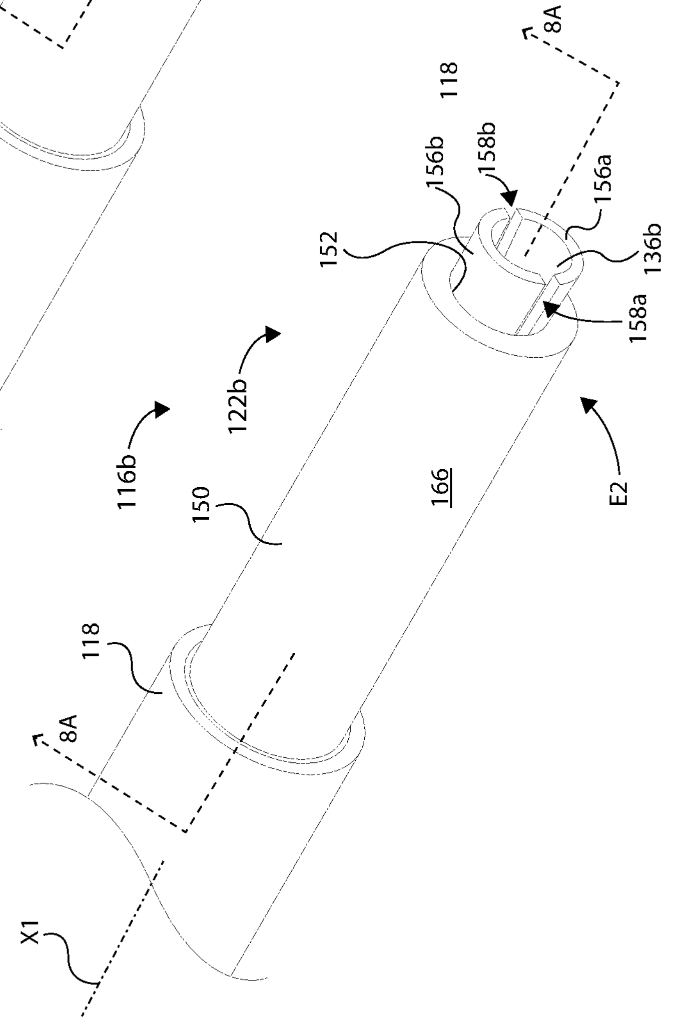
FIG. 7A is an isometric view of the second end of the resetting tool of FIG. 1, showing the second end in a retracted position, as also shown in FIG. 8A, for resetting a male electrical contact.

With continued reference to FIGS. 1-4, and with reference to FIGS. 7A-8B (and also FIGS. 9A and 9B), the movable rod 130 can comprise second opposing flex members 156*a* and 156*b* formed about its end portion 132*c* that are operable to slide through the tapered flex channel 154 of the tapered portion 150 to cause the second opposing flex members 156*a* and 156*b* to transition from an extended position E2 (FIGS. 7A and 8A) to a retracted position R2 (FIGS. 7B and 8B) to apply an inward compression force around the male electrical contact 106*a* to move the male electrical contact 106*a* from the displaced position P1 (FIGS. 2A, 8A) to a reset position P2 (FIG. 8B). More specifically, the second opposing flex members 156*a* and 156*b* can be defined or formed by at least two slots 158*a* and 158*b* extending axially from ends of the second opposing flex members 156*a* and 156*b* and the end opening 152 toward the other end of the movable rod 130. The slots 158*a* and 158*b* can be formed into the movable rod 130 and configured to extend a distance sufficient to facilitate a suitable degree of flex of second opposing flex members 156*a* and 156*b*, such that they are made compliant, and such that moving or sliding the second opposing flex members 156*a* and 156*b* down onto the male electrical contact 106*a* causes the second opposing flex members 156*a* and 156*b* to outwardly flex as the second end 116*b* of the resetting tool 100 is caused to slide down and around an outer surface 159 of the male electrical contact 106*a*. This can be achieved because of the outward tapered configuration of the tapered flex channel 154, which permits the second opposing flex members 156*a* and 156*b* to flex or bend outwardly when moved to the extended position E2 to facilitate interfacing with the male electrical contact 106*a*. This is best illustrated in FIGS. 7A and 8A, showing the second opposing flex members 156*a* and 156*b* sliding along a tapered surface 160 of the tapered portion 150, such that the second opposing flex members 156*a* and 156*b* conform to the shape of the tapered surface 160. This can be achieved by forming the second opposing flex members 156*a* and 156*b* so as to comprise an outward tapered configuration during manufacturing, such that their default unflexed position (without restraint) is an outward tapered position. Alternatively, the second opposing flex members 156*a* and 156*b* can comprise a default of unflexed configuration that is linear rather than tapered, meaning that the second opposing flex members 156*a* and 156*b* can be a linear extension of the movable rod 130, yet still compliant because of the slots 158*a* and 158*b*, so that when being interfaced to a tip area of the male electrical contact 106*a*, the second opposing flex members 156*a* and 156*b* automatically outwardly flex or bend and "wrap around" the male electrical contact 106*a* while being axially moved down onto the male electrical contact 106*a*. In either case, inner radial surfaces 162*a* and 162*b* of the second opposing flex members 156*a* and 156*b* can be interfaced to, and compressed around, the outer surface 159 of the male electrical contact 106*a*, such as illustrated in FIGS. 8A and 9A. In this position, a portion of the male electrical contact 106*a* in contained within a flex member channel 161 of the movable rod 130 defined by the second opposing flex members 156*a* and 156*b*.

Upon moving the movable rod 130 axially in a direction relative to the elongate housing 118 (via the handle 136) and toward the male electrical contact 106*a*, the second opposing flex members 156*a* and 156*b* are moved to the extended position E2 of FIG. 8A. Once the second opposing flex members 156*a* and 156*b* are positioned around the male electrical contact 106*a*, the elongate housing 118, with its longitudinal channel, and the movable rod 130 can be moved relative to one another (e.g., in one example, the elongate housing 118 can be moved axially (downwardly) toward the connector structure 104, while the movable rod 130 is caused to move axially (upwardly) in a direction into the elongate housing 118). The relative movement between the elongate housing 118 and the movable rod 130 in this manner causes the second opposing flex members 156*a* and 156*b* to slide through the tapered flex channel 154, which causes the second opposing flex members 156*a* and 156*b* to inwardly flex or bend due to the aforementioned shape of the tapered flex channel 154. This decreases the effective diameter or profile defined by the second opposing flex members 156*a* and 156*b*, which causes an inward compression force from the second opposing flex members 156*a* and 156*b* to act on the outer surface 159 of the male electrical contact 106*a*. In response to such relative movements of the elongate housing 118 and the movable rod 130, and due to such inward compression force, the male electrical contact 106*a* is gripped or grasped by the second opposing flex members 156*a* and 156*b*, and subsequently caused to slide upwardly through a support opening 164 of the connector structure 104 from the displaced position P1 of FIG. 8A to the reset position P2 of FIG. 8B.

As illustrated in FIG. 8B, an end surface 167 of the tapered portion 150 can interface with or be seated against a connector support ring 169 of the connector structure 104 during resetting of the male electrical contact 106*a*, which helps to resist movement of the elongate housing 118 relative to the connector structure 104 so that the second flex members 158*a* and 158*b* can appropriately pull the male electrical contact 106*a* upwardly in an axial manner.

It is noted herein, that the manner of operation described above is not intended to be limited in any way. For example, the resetting tool 100 can be configured, such that once the second opposing flex members 156*a* and 156 be are disposed over the male electrical connector, rather than simultaneously pushing the elongate housing toward the connector while moving the movable rod away from the connector, an alternative manner of operation could be pushing the elongate housing toward the connector until a sufficient compression force is generated and applied to the male electrical contact, and then pulling up on the entire resetting tool 100 to reset the male electrical connector.

Note that first or second "opposing flex members" can each be defined by one or more slots (see e.g., FIGS. 10A and 10B), and even up to six slots or more, such as to define "opposing flex members" that correspond to the number of formed slots. Thus, "opposing" can mean the flex members are immediately radially opposite each other, such as first opposing flex members 128*a* and 128*b*. As another example, "opposing" can mean adjacent flex members, whether forming one slot or six slots, wherein at least a portion of the flex members are radially opposite one another, such as would be the case with flex members formed from a single slot where the flex members flex or move toward or away from one another (thus narrowing or widening the slot, respectively) as they move radially inward or outward, respectively. Thus, in the example of six slots, each of the flex members defined by the six slots can all "oppose" each other in some manner, whether adjacent each other or opposite each other in a lateral direction. As can be seen, the opposing flex members can be formed in a number of different ways to accomplish the function of applying an even, radial force (defining an infinite number of opposing radial forces) to the electrical contacts being reset.

After the male electrical contact 106*a* has been reset, the movable rod 130 and the elongate housing 118 can be caused to again move relative to one another (e.g., the movable rod 130 can be pushed back out of the elongate housing 118 by moving the handle 136 relative to the elongate housing 118) in a manner so as to position the second opposing flex members 158*a* and 158*b* of the second end 116*b* in the extended position E2 (FIG. 7A), which releases the compression force on the male electrical contact 106*a* so that the tool 100 can be disengaged from the reset male electrical contact 106*a*.

Notably, because of the curved or radial shapes of the inner radial surfaces 163*a* and 163*b* of the second opposing flex members 158*a* and 158*b*, and because the second opposing flex members 158*a* and 158*b* oppose each other, a substantially uniform compression force can be applied to the outer radial surface 159 of the male electrical contact 106*a*. This allows the male electrical contact 106*a* to be aligned and pulled in an axial manner into the reset position P2, which better resets the male electrical contact 106*a* into its proper position because it reduces the likelihood of rotating or twisting the male electrical contact 106*a* while being reset. Such configuration also reduces the likelihood of damaging or scratching the male electrical contact 106*a*, because the surface-to-surface contact is maximized in a radial direction between the male electrical contact 106*a* and the second opposing flex members 158*a* and 158*b*.

Notably, the second end 116*b* of the resetting tool 100 has a relatively low profile, so that it can be inserted into relatively small openings to gain access to the male electrical contact 106*a*, such as to fit between the male electrical contact to be reset and any adjacent male electrical contacts, or between the male electrical contact to be reset and the inner walls of the connector (see FIG. 2A), or both. Specifically, the outermost surfaces or profile of the second side 116*b* of the resetting tool 100 is the outer radial surface 166 of the tapered portion 150, so that the second side 116*b* can fit into tight areas or access openings, and from a mating side of the connector, to access and reset male electrical contacts.

FIGS. 9A and 9B illustrate an alternative method of using the second side 116*b* to reset a male electrical contact (e.g., 106*a* of FIG. 2A) from the displaced position P1 (e.g., FIGS. 2A and 9A) to the reset position P2 (e.g., FIGS. 2A and 9B). More particularly, the movable rod 130 can comprise the second opposing flex members 156*a* and 156*b* formed about its end portion 132*c* that are operable to slide upwardly through the tapered flex channel 154 of the tapered portion 150 to cause the second opposing flex members 156*a* and 156*b* to transition from a retracted position R3 (FIG. 9A) to an extended position E3 (FIG. 9B) to apply an inward compression force around the male electrical contact 106*a* to move the male electrical contact 106*a* from the displaced position P1 (FIGS. 2A, 9A) to a reset position P2 (FIG. 9B). As noted above, slots 158*a* and 158*b* can be formed into the movable rod 130 and configured to extend a distance sufficient to facilitate a suitable degree of flex of second opposing flex members 156*a* and 156*b*, such that they are made compliant, and such that moving or sliding the second opposing flex members 156*a* and 156*b* down onto the male electrical contact 106*a* causes the second opposing flex members 156*a* and 156*b* to outwardly flex as the second end 116*b* of the resetting tool 100 is caused to slide down and around an outer surface 159 of the male electrical contact 106*a*. This can be achieved because of the outward tapered configuration of the tapered flex channel 154, which permits the second opposing flex members 156*a* and 156*b* to flex or bend outwardly when moved to the extended position E3 to facilitate interfacing with the male electrical contact 106*a* for pulling it upwardly via the resetting tool 100. This is best illustrated in FIG. 9A, showing the second opposing flex members 156*a* and 156*b* sliding along a tapered surface 160 of the tapered portion 150, such that the second opposing flex members 156*a* and 156*b* conform to the shape of the tapered surface 160. Thus, when being interfaced to a tip area of the male electrical contact 106*a*, the second opposing flex members 156*a* and 156*b* can automatically outwardly flex or bend and "wrap around" the male electrical contact 106*a* while being axially moved down onto the male electrical contact 106*a*. In this position, a portion of the male electrical contact 106*a* in contained within a flex member channel 161 of the movable rod 130 defined by the second opposing flex members 156*a* and 156*b*.

Upon moving the movable rod 130 axially in a direction relative to the elongate housing 118 (via the handle 136) and toward the male electrical contact 106*a*, the second opposing flex members 156*a* and 156*b* are moved to the extended position E3 of FIG. 9B. Once the second opposing flex members 156*a* and 156*b* are positioned around the male electrical contact 106*a*, the elongate housing 118 and the movable rod 130 can be upwardly moved away from the connector structure 104. In response to such movement, the male electrical contact 106*a* is gripped or grasped by the second opposing flex members 156*a* and 156*b*, and subsequently caused to slide upwardly through a support opening 164 of the connector structure 104 from the displaced position P1 of FIG. 9A to the reset position P2 of FIG. 9B.

Figure 10A:
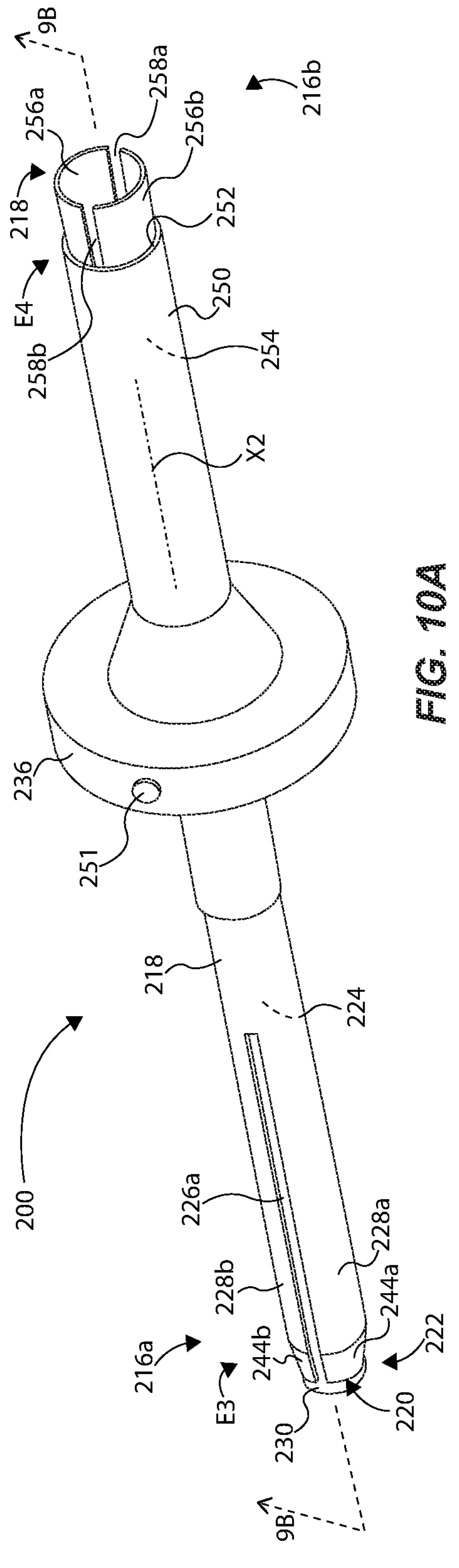
FIG. 10A is an isometric view of a resetting tool in accordance with an example of the present disclosure.
Figure 10B:
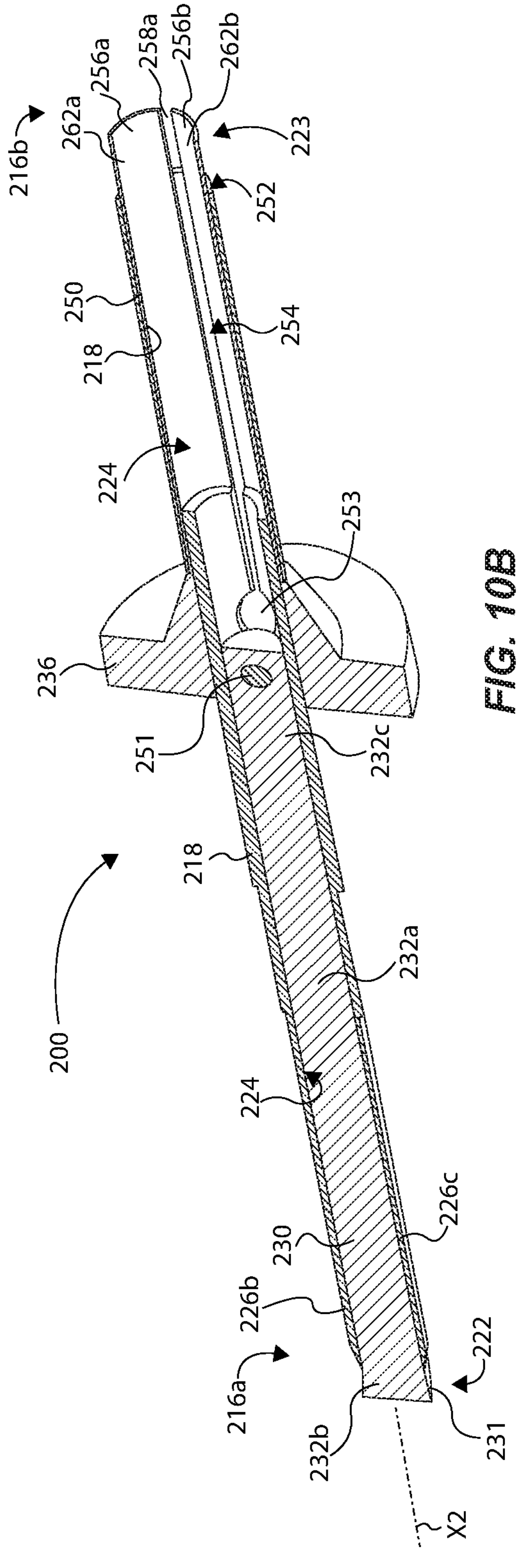
FIG. 10B is an isometric cross sectional view of the resetting tool of FIG. 10A, and taken across lines 10B-10B, and showing a first end in an extended position and a second end in an extended position.

FIGS. 10A and 10B illustrate a resetting tool 200 in accordance with an example of the present disclosure, showing a first side 216*a* in an extended position E3 and a second end 216*b* in an extended position E4. Similarly as described above with the resetting tool 100, the resetting tool 200 is configured and operates to reset positions of male and female electrical contacts (e.g., 106*a* and 112*a*) from the mating side of the respective connectors in support of these, while eliminating or reducing the likelihood of damaging the contacts when being reset. More specifically, the first side 216*a* is operable to reset a female electrical contact from a displaced position (e.g., female electrical contact 112*a* shown in FIG. 2B) to a reset position, and the second side 216*b* is operable to reset a male electrical contact from a displaced position (e.g., see male electrical contact 106*a* shown in FIG. 2B) to a reset position.

The resetting tool 200 can comprise an elongate housing 218 comprising an opening 220 about a first end 222 of the elongate housing 218, The elongate housing 218 can define a longitudinal channel 224 extending from the opening 220 through the length of the elongate housing 218. A movable rod 230 is supported within the elongate housing 218, and is slidable bi-directionally within the longitudinal channel 224. The movable rod 230 can comprise a middle portion 232*a*, a first end portion 232*b*, and a second end portion 232*c*, Proximate the first end 222, the elongate housing 218 can have a one or more slots (e.g., see slots 226*a-d* (three of four being labeled)) formed through the elongate housing 218 axially so as to define first opposing flex members 228*a-d* (two of four labeled). The first end portion 232*b* of the movable rod 230 can have an outward tapered portion 231 that slides bi-directionally through a flex channel of the first opposing flex members 228*a-d*, as further detailed below.

A handle 236 can be coupled to the movable rod 230 for collectively translating the movable rod 230 and the handle 230 bi-directionally relative to the elongate housing 218, The handle 236 can be formed of a variety of shapes and sizes, such as a cylindrical disk having a tubular extension as shown, that extends or transitions into a tapered portion 250 for operation of the second side 216*b* of the resetting tool 200, which is further detailed below. A pin 251 can extend laterally through the handle 236 and through the second end portion 232*c* of the movable rod 230 for coupling the handle 236 to the movable rod 230. A pair of opposing limit slots 253 (one shown) can be formed on either side of the elongate housing 218 for facilitating and limiting the bi-directional movement of the movable rod 230 relative to the elongate housing 218.

In operation, and with reference also to the similar example of FIGS. 5A-6B discussed above, the moveable rod 230 is operable to slide about the first opposing flex members 228*a-d* (via operation of the handle 236) to cause the first opposing flex members 228*a-d* to transition from a retracted position (see e.g., FIGS. 5A and 6A) to an extended position (FIGS. 10A and 10B) (see also e.g., FIGS. 5B and 6B) for resetting a position of a female electrical contact (e.g., 112*a*). However, in this example tip areas or portions of the first opposing flex members 228*a-d*, and the tapered portion 231 of the movable rod 230, can be configured to fit within a socket area of a female electrical contact (e.g., FIG. 6A), while the end portion 234*b* of the movable rod 230 is in the extended position of FIGS. 10A and 10B. More specifically, the first opposing flex members 228*a-d* can comprise tapered tips or tip portions, respectively. In the example shown, an outer surface of the elongate housing 218 at each of the first opposing flex members 228*a-d* tapers inward and toward the opening 220 from a point on the elongate housing 218 away from the opening. Moreover, the movable rod 230 comprises a tapered end portion 231 that tapers outward and toward an endmost portion of the first end 232*b* of the movable rod 230 from a point on the movable rod 230 away from the endmost portion. The tapered tip portions of the first opposing flex members 228*a-d* collectively reduce the diameter of the elongate housing 218 at the first side 216*a*, while the tapered end 231 of the movable rod effectively increases the diameter of the movable rod 230 about its end 232*b*. In one example, the tapered portion 231 of the movable rod 230 can comprise a diameter that is the same as or similar to the outer diameter of the elongate housing 218.

With a female electrical contact in a displaced position (e.g., D1 of FIG. 6A) in a connector structure, once the first opposing flex members 228*a-d* and the tapered portion 231 are fit within the socket area of the female electrical socket, the end portion 232*b* of the movable rod 230 can be moved axially away from the female electrical contact by engaging and moving the handle 236 away from the female electrical contact. During such motion, the end portion 232*b* of the movable rod 230 slides along inner surfaces of the first opposing flex members 228*a-d*, which causes them to outwardly flex or bend outwardly relative to the longitudinal axis X2, thereby increasing a diameter defined by the first opposing flex members 228*a-d*. As a result, outer curved or radial surfaces 244*a-d* (two of four labeled) of the first opposing flex members 228*a-d* compress (apply a force)

outwardly against the inner radial surface of the female electrical contact (see e.g., although the resetting tool 200 differs in how it functions from resetting tool 100, a similar force is applied as that described above with respect to FIG. 6B). Concurrently (or sequentially), the elongate housing 218 and the movable rod 230 can be moved axially (upwardly) by a user via the handle 236 in a direction away from the connector structure (while the compression force is applied to the female electrical contact by the first opposing flex members 228*a-d*), such that the female electrical contact is caused to slide upwardly through a support opening from the displaced position of to the reset position, similarly as discussed regarding FIGS. 6A and 6B.

After the female electrical contact has been reset, tapered portion 231 of the movable rod 230 can be extended back out of the elongate housing 218 by moving the handle 236 relative to the elongate housing 118, thereby placing the first side 216*a* in the extended position. This disengages the tapered portion 231 of the movable rod 230 from the first opposing flex members 228*a-d*. As a result, because of their compliant configuration, the first opposing flex members 228*a-d* automatically return to their normal or default or retracted positions. In this way, the first opposing flex members 228*a-d* can then be removed from the socket area of the female electrical contact, and then the resetting tool 200 is ready for another operation to reset another female electrical contact.

Notably, because of the curved or radial shapes of the outer radial surfaces 244*a-d* of the first opposing flex members 228*a-d*, a substantially uniform compression force can be applied to the inner radial surface of the female electrical contact. This assists to align and pull the female electrical contact in an axial manner into a reset position, which better resets the female electrical contact into its proper position because it reduces the likelihood of rotating or twisting the female electrical contact while being reset. Such configuration also reduces the likelihood of damaging or scratching the female electrical contact, because the surface-to-surface contact is maximized in a radial direction between the female electrical contact and the first opposing flex members 228*a-d*.

It is further noted that the first side 216*a* of the resetting tool 200 has a relatively low profile, so that it can be inserted into relatively small openings to gain access to the female electrical contact (see e.g., FIG. 2B). Specifically, the outermost surfaces or profile of the first side 216*a* of the resetting tool 200 are defined by the outer radial surfaces 244*a-d* of the first opposing flex members 228*a-d* and the tapered end 231 of the movable rod 230, which are configured so as to be small enough so that the first side 216*a* can fit past or through a structural opening of a connector (e.g., 108) and into the female electrical contact. This provides a resetting tool that can gain access to tight areas or access openings, and from a mating side of the connector, to access and reset female electrical contacts.

As mentioned above, the second side 216*b* is operable to reset a male electrical contact (e.g., 106*a* of FIG. 2B) from a displaced position (see e.g., FIG. 8A) to a reset position (see e.g., FIG. 8B). More particularly, the second side 216*b* of the resetting tool 200 can comprise or include a tapered portion 250 that can be formed as part of the handle 236 (e.g., a tubular extension), or it can be a separate component attached to the handle 236. The tapered portion 250 can comprise an end opening 252 and can define a tapered flex channel 254 about a second end 223 of the elongate housing 218. The tapered flex channel 254 can be tapered outward from an inward location or point of the tapered portion 250 (i.e., one near the handle 236) to the end opening 252, the tapered portion 250 comprising a larger diameter at end opening 252.

The elongate housing 218 can comprise second opposing flex members 256*a* and 256*b* operable to slide through the tapered flex channel 254 of the tapered portion 250 of the handle 236 to cause the second opposing flex members 256*a* and 256*b* to transition from an extended position (FIGS. 10A and 10B) to a retracted position (similar as shown in FIGS. 7B and 8B) to apply an inward compression force around a male electrical contact (e.g., 106*a*) to move the male electrical contact from a displaced position (see e.g., FIGS. 2A, 8A) to a reset position (see e.g., FIG. 8B). More specifically, the second opposing flex members 256*a* and 256*b* can be defined or formed by slots 258*a* and 258*b* formed axially from an end of the elongate housing 218. The slots 258*a* and 258*b* can extend a distance through the elongate housing 218 to the limit slots 253, as shown, or the slots 258*a* and 258*b* can terminate prior to the limit slots 253 (similarly as slots 158*a* and 158*b*). More than two slots can be formed to define more than two opposing flex members, similarly as discussed above.

This configuration provides second opposing flex members 256*a* and 256*b* that are compliant, such that moving or sliding the second opposing flex members 256*a* and 256*b* down onto the male electrical contact causes the second opposing flex members 256*a* and 256*b* to outwardly flex and slide down and around an outer surface of the male electrical contact, similarly as those of the resetting tool 100 shown in the example of FIG. 8A. This can be achieved because of the outward tapered configuration of the tapered flex channel 254, which permits the second opposing flex members 256*a* and 256*b* to flex or bend outwardly when moved to the extended position to facilitate interfacing with the male electrical contact. Alternatively, the second opposing flex members 256*a* and 256*b* can be a linear extension of the elongate housing 218 (e.g., not outwardly tapered, but linearly extending relative to a longitudinal axis of the elongate housing), yet compliant enough so that when being interfaced with a tip of the male electrical contact the second opposing flex members 256*a* and 256*b* automatically outwardly flex or bend and “wrap around” the male electrical contact while being axially moved down onto the male electrical contact. In either case, inner radial surfaces 262*a* and 262*b* of the second opposing flex members 256*a* and 256*b* can be interfaced to, and compressed around, the outer surface of the male electrical contact. Thus, upon moving the handle 236 (and its tapered portion 250) axially in a first direction relative to the elongate housing 218, the second opposing flex members 256*a* and 256*b* are moved to the extended position, such as shown in FIGS. 10A and 10B. Once the second opposing flex members 256*a* and 256*b* are positioned around the male electrical contact, the handle 236 can be moved axially toward the connector structure supporting the male electrical contact. This causes the second opposing flex members 256*a* and 256*b* to slide through the tapered flex channel 254, which causes the second opposing flex members 256*a* and 256*b* to inwardly flex or bend due to the shape of the tapered flex channel 254. This decreases the effective diameter or profile defined by the second opposing flex members 256*a* and 256*b*, which causes a compression force from the second opposing flex members 256*a* and 256*b* to be applied to the outer surface of the male electrical contact. In response to such movement of the elongate housing 218 relative to and through the handle 236 and the tapered portion 250, and due to such compression force, the male electrical contact is gripped or grasped and caused to slide upwardly through a support opening of a connector structure from the displaced position (see e.g., FIG. 8K to the reset position (see e.g., FIG. 8B).

Notably, because of the curved or radial shapes of the inner radial surfaces of the second opposing flex members 258*a* and 258*b*, and because the second opposing flex members 258*a* and 258*b* oppose each other, a substantially uniform compression force can be applied to the outer radial surface of the male electrical contact. This assists to align and pull the female electrical contact in an axial manner into the reset position, which better resets the male electrical contact into its proper position because it reduces the likelihood of rotating or twisting the male electrical contact while being reset. Such configuration also reduces the likelihood of damaging or scratching the male electrical contact, because the surface-to-surface contact is maximized in a radial direction between the male electrical contact and the second opposing flex members. Further, the second end 216*b* of the resetting tool 200 has a relatively low profile, so that it can be inserted into relatively small openings or spaces to gain access to male electrical contacts, similarly as described above with respect to the resetting tool 100.

Note that the resetting tools exemplified herein (i.e., resetting tools 100 and 200) are double-sided operationally, meaning that one side is used to reset female electrical contacts, and the other side is used to reset male electrical contacts with the handle being operational to actuate each side. However, it is contemplated herein, and it will be apparent to those skilled in the art, that other example resetting tools can comprise a single-sided operational tool, meaning that they are only configured and operational to reset female or male electrical contacts, but not both, as the case may be. Thus, the present disclosure can include a first resetting tool for resetting female electrical contacts, wherein the first resetting tool comprises an operational end that can be similar to the first side 116*a* of resetting tool 100 or the first side 216*a* of resetting tool 200, with the resetting tool comprising a handle operable to actuate the operational end. The present disclosure further contemplates a second resetting tool for resetting male electrical contacts, wherein the second resetting tool comprises an operational end that can be similar to the second side 116*b* of resetting tool 100 or the second side 216*b* of resetting tool 200, with the resetting tool comprising a handle operable to actuate the operational end.

The handles exemplified herein can alternatively be a trigger type handle that is more ergonomically friendly, which may require linkage(s) to the respective components to effectively pull the trigger to move the movable rod 130, for instance. The second opposing flex members exemplified herein can be defined by a single slot, so that the second opposing flex members may have opposing portions or members that bend or flex toward and away from each other during the operations discussed above. The same holds true for the first opposing flex members, meaning that they can be defined by a single slot. The various slots exemplified herein can be of any suitable length and size to provide some amount of compliant flex members. The components discussed herein can be comprised of rigid or semi-rigid materials, such as steel, aluminum, composite, polymer, etc., and can be formed by 3D printing, machining, and other suitable means.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A resetting tool for resetting a position of a female electrical contact of a connector from a mating side of the connector, the resetting tool comprising:

an elongate housing comprising:

- an opening about a first end;
- a longitudinal channel extending from the opening at least part way through the elongate housing;
- at least one slot formed in the elongate housing and extending from the opening so as to define opposing flex members formed on an inward taper with respect to the elongate housing; and a movable rod supported within the elongate housing, and slidable bi-directionally within the longitudinal channel, the moveable rod having an end portion slidable about the opposing flex members to cause the opposing flex members to transition from a retracted position to an extended positon, wherein, in the extended position, the opposing flex members are operable to apply a compression force on a female electrical contact to facilitate resetting of the female electrical contact.

2. The resetting tool of claim 1, wherein the at least one slot comprises two slots that define the opposing flex members movable by the end portion of the movable rod between the retracted and extended positions.

3. The resetting tool of claim 2, wherein the opposing flex members comprise outer radial surfaces that cooperate to apply, in a uniform manner, the compression force to an inner annular surface of the female electrical contact when moved to the extended position.

4. The resetting tool of claim 1, wherein the opposing flex members are formed on an inward taper relative to a longitudinal axis of the elongate housing when in the retracted position.

5. The resetting tool of claim 1, further comprising a handle operable with the moveable rod and the elongate housing to facilitate translation of the movable rod bi-directionally within the longitudinal channel.

6. The resetting tool of claim 1, wherein an inner diameter of the elongate housing at the opening is smaller than an outer diameter of the end portion of the movable rod.

7. The resetting tool of claim 1, wherein the opposing flex members are compliant, such that disengagement of the end portion of the movable rod causes the opposing flex members to automatically return to the retracted position.

8. A resetting tool for resetting a position of a male electrical contact of a connector from a mating side of the connector, the resetting tool comprising:

an elongate housing comprising an opening about a first end, and defining a longitudinal channel extending from the opening, the longitudinal channel comprising a tapered portion about the first end; and a movable rod supported within the elongate housing and slidable bi-directionally within the longitudinal channel of the elongate housing, the movable rod comprising:

an opening;

a flex channel extending from the opening; and at least one slot formed in the movable rod about the flex channel, and extending from the opening of the movable rod so as to define opposing flex members operable to transition from an extended position to a retracted positon, wherein, upon relative movement between the elongate housing and the movable rod, the opposing flex members slide through the tapered portion of the longitudinal channel to apply a compression force to the male electrical contact, and to facilitate resetting of the male electrical contact.

9. The resetting tool of claim 8, wherein the at least one slot comprises at least two slots that define the opposing flex members movable between the retracted and extended positions when slidably moved through the tapered portion.

10. The resetting tool of claim 9, wherein the opposing flex members are formed on an outward taper relative to a longitudinal axis of the elongate housing when in the extended position, and wherein the tapered portion of the longitudinal channel comprises a tapered channel.

11. The resetting tool of claim 9, wherein the opposing flex members comprise inner radial surfaces that cooperate to apply a uniform inward compression force to an outer annular surface of the male electrical contact when the opposing flex members are moved to the retracted position.

12. The resetting tool of claim 8, further comprising a handle operable with the moveable rod to facilitate translation of the movable rod bi-directionally within the longitudinal channel.

13. The resetting tool of claim 8, wherein the opposing flex members are compliant, such that the opposing flex members automatically flex outwardly when transitioning to the extended position.

14. A resetting tool operable to reset a male electrical contact of a connector structure, and a female electrical contact of a mating connector structure, the resetting tool comprising:

an elongate housing comprising a first end and a second end, and defining a longitudinal channel extending between the first and second ends, the first end comprising first opposing flex members formed on an inward taper and configured to fit within a female electrical contact, the longitudinal channel comprising a tapered portion about the second end; and a movable rod supported within the elongate housing, and slidable bi-directionally within the longitudinal channel, the moveable rod having a first end portion operable to cause the first opposing flex members to transition from a retracted position to an extended positon to facilitate application of an outward compression force to a female electrical contact, and resetting of a position of the female electrical contact, the movable rod having a second end portion comprising second opposing flex members operable to slide through the tapered portion of the longitudinal channel of the elongate housing to cause the second opposing flex members to transition from between extended and retracted positons to facilitate application of an inward compression force to a male electrical contact, and resetting of a position of the male electrical contact, wherein the resetting tool is operable to reset the positions of the female and male electrical contacts from a mating side of respective connectors in support of each of the female and male electrical contacts.

15. The resetting tool of claim 14, wherein the first opposing members are defined by at least two slots formed through the elongate housing at the first end, and wherein the second opposing flex members are defined by at least two slots formed through the movable rod at the second end portion.

16. The resetting tool of claim 14, wherein the first opposing flex members are compliant and formed on an inward taper relative to a longitudinal axis of the elongate housing, and wherein the second opposing flex members are compliant.

17. The resetting tool of claim 14, further comprising a handle operable with the moveable rod to facilitate translation of the movable rod bi-directionally within the longitudinal channel, and relative movement between the elongate housing and the movable rod.

18. An electronics assembly comprising a connector having a wiring side, a mating side, and at least one female electrical contact extending from the mating side, the at least one female electrical contact being resettable from the mating side of the connector by the first opposing flex members of the resetting tool of claim 14.

19. An electronics assembly comprising a connector having a wiring side, a mating side, and at least one male electrical contact extending from the mating side, the at least one male electrical contact being resettable from the mating side of the connector by the second opposing flex members of the resetting tool of claim 14.

* * * * *